US008589899B2

(12) United States Patent
Ishizaki

(10) Patent No.: US 8,589,899 B2
(45) Date of Patent: Nov. 19, 2013

(54) OPTIMIZATION SYSTEM, OPTIMIZATION METHOD, AND COMPILER PROGRAM

(75) Inventor: Kazuaki Ishizaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/221,984

(22) Filed: Aug. 31, 2011

(65) Prior Publication Data

US 2012/0054470 A1 Mar. 1, 2012

(30) Foreign Application Priority Data

Sep. 1, 2010 (JP) ................................. 2010-195944

(51) Int. Cl.
*G06F 9/45* (2006.01)
(52) U.S. Cl.
USPC ........................... 717/153; 717/148; 717/151
(58) Field of Classification Search
None
See application file for complete search history.

(56) References Cited

U.S. PATENT DOCUMENTS

| 6,289,506 | B1 * | 9/2001 | Kwong et al. ................ 717/148 |
| 6,973,646 | B1 * | 12/2005 | Bordawekar et al. ......... 717/146 |
| 7,493,610 | B1 * | 2/2009 | Onodera et al. .............. 717/155 |
| 2004/0019770 | A1 | 1/2004 | Kawahito |
| 2005/0028132 | A1 * | 2/2005 | Srinivasamurthy et al. .. 717/100 |
| 2005/0138611 | A1 * | 6/2005 | Inglis et al. .................... 717/151 |
| 2006/0123397 | A1 * | 6/2006 | McGuire ....................... 717/127 |
| 2009/0024986 | A1 * | 1/2009 | Meijer et al. .................. 717/137 |
| 2009/0049421 | A1 * | 2/2009 | Meijer et al. .................. 717/100 |
| 2009/0319739 | A1 * | 12/2009 | Shpeisman et al. ........... 711/163 |
| 2010/0162249 | A1 * | 6/2010 | Shpeisman et al. ........... 718/101 |
| 2010/0299658 | A1 * | 11/2010 | Ng et al. ....................... 717/140 |

FOREIGN PATENT DOCUMENTS

| JP | 2002-132521 | 5/2002 |
| JP | 2004-62520 | 2/2004 |

OTHER PUBLICATIONS

Vasanth Bala et al., Dynamo: a transparent dynamic optimization system, ACM SIGPLAN vol. 35 Issue 5, May 2000, [Retrieved on Aug. 1, 2012]. Retrieved from the internet: <URL: http://dl.acm.org/citation.cfm?id=349303> 12 Pages (1-12).*

David Hiniker et al., Improving Region Selection in Dynamic Optimization Systems, 0-7695-2440-0, IEEE 2005, [Retrieved on Aug. 1, 2012]. Retrieved from the internet: <URL: http://ieeexplore.ieee.org/stamp/stamp.jsp?tp=&arnumber=1540955> 11 Pages (1-11).*

(Continued)

*Primary Examiner* — Don Wong
*Assistant Examiner* — Anibal Rivera
(74) *Attorney, Agent, or Firm* — Preston J. Young

(57) ABSTRACT

A system, method and article of manufacture of increasing access speed of frequently accessed variables (symbols) in a dynamic language program. The system includes a range identifying unit to identify a range for communizing symbol accesses in the program; an instruction generating unit to generate instructions to access a symbol table using a key, to get an address of a symbol entry, and to store the address; an instruction extracting unit to fetch instructions from the identified range; and an instruction judging unit to determine whether or not each of the fetched instructions is an instruction to access the symbol. If the fetched instruction is an instruction to access the symbol, and the symbol is present when generating an instruction to access the symbol by using an address of the stored symbol entry, an instruction is generated allowing access to the symbol without checking whether the symbol is present.

21 Claims, 16 Drawing Sheets

(56) References Cited

OTHER PUBLICATIONS

Alex Ramirez et al., Fetching instruction streams, 2002 IEEE, 0-7695-1859-1, [Retrieved on Aug. 1, 2012]. Retrieved from the Internet: <URL: http://dl.acm.org/citation.cfm?id=774901> 12 Pages (371-385).*

Biggar, P., et al., "A Practical Solution for Scripting Language Compilers," Preprint submitted to Sciene of Computer Programming, Aug. 16, 2009. Downloaded from http://www.paulbiggar.com/research/wip-sac-journal.pdf on Jul. 13, 2011 (available online Feb. 8, 2011).

Pall, M., "LuaJIT 2.0 Intellectual Property Disclosure and Research Opportunities," Lua-Users Archive, Nov. 2, 2009, available at http://lua-users.org/lists/lua-1/2009-11/msg00089.html.

* cited by examiner (a)

```
Class A {
  int x ;
}
A a = new A() ;
int i = a.x
```

(b)

```
//r10 : address of a
//r31 : i
ld r31, offset_x(r10)
```

(c)

```
//r3 : address of instance A
//r31 : I
li r3, key #x
r31 = call get_symbol(argument r3)
```

```
i = a.x
..
j = a.x
..
a.x = 123
a.method()
..
k = a.x
```

(b)

```
Entry *_Entx = get_symbol_entry(a, #x)
if ((i = _Entx->val) == NULL) throw noEntryException
..
if ((j = _Entx->val) == NULL) throw noEntryException
..
if ((_Entx->val != NULL) _Entx->val = 123
  else throw noEntryException
a.method()
..
if ((k = _Entx->val) == NULL) throw noEntryException
```

Fig. 3

(a)  i = a.x
    . .
    j = a.x
    . .
    a.x = 123
    a.method()
    . .
    k = a.x
    del a.x (b)  Entry *_Entx = get_symbol_entry(a, #x)
    NOP
    i = _Entx->val
    . .
    NOP
    j = _Entx->val
    . .
    NOP
    _Entx->val = 123
    a.method()
    . .
    NOP
    k = _entx->val
    _Entx->val = NULL (c)  Entry *_Entx = get_symbol_entry(a, #x)
    if (_Entx->val == NULL) throw noEntryException
    i = _Entx->val
    . .
    if (_Entx->val == NULL) throw noEntryException
    j = _Entx->val
    . .
    if (_Entx->val == NULL) throw noEntryException
    _Entx->val = 123
    a.method()
    . .
    if (_Entx->val) == NULL) throw noEntryException
    k = _Entx->val
    _Entx->val = NULL

Fig. 5

```
Entry *_Entx = get_symbol_entry(a, #x)
i = _Entx->val ;
t = i->_type
..
j = _Entx->val ;
t = j->_type
..
t = _Entx->val->_type
_Entx->val = IntObj(123)
a.method()
..
k = _Entx->val
t = k->_type
_Entx->val = 0xbaadfood
```

Fig. 8

```
Entry *_Entx = get_symbol_entry(a, #x)
i = _Entx->val
trapi eq, i, 0
..
j = _Entx->val
trapi eq, j, 0
..
_tmp = _Entx->val
trapi eq, _tmp, 0
_Entx->val = IntObj(123)
a.method()
..
k = _Entx->val
trapi eq, k, 0
_Entx->val = 0
```

Fig. 11

```
Entry *_Entx = get_symbol_entry(a, #x)
i = _Entx->val
..
j = _Entx->val
..
_tmp = _Entx->val
_Entx->val = IntObj(123)
a.method()
..
k = _Entx->val
_Entx->val = 0x80000000
```

Fig. 14

OPTIMIZATION SYSTEM, OPTIMIZATION METHOD, AND COMPILER PROGRAM

CROSS REFERENCE TO RELATED APPLICATIONS

This application claims priority under 35 U.S.C. §119 to Japanese Patent Application No. 2010-195944 filed on Sep. 1, 2010, the entire contents of which are incorporated herein by reference.

BACKGROUND OF THE INVENTION

1. Field of the Invention

The present invention relates to an optimization system, an optimization method, and an computer-readable compiler program for implementing the method of performing optimization processing for a program described in a dynamic language so as to increase the access speed of methods or variables (symbols) frequently accessed during execution of the program, while guaranteeing the program to operate in the same manner as before the optimization.

2. Description of Related Art

Programming languages are used in order to control machines or computers. The programming languages are categorized as static or dynamic languages. A static language, such as C, is a procedural language and is designed as a compiler language. Other examples of static languages are C++ which was developed as an extension of the C, and Java (registered trademark). Dynamic languages include Ruby (registered trademark), Python (registered trademark) and JavaScript (registered trademark).

A program in a static language is complied by checking the types of all the variables therein. The compiling is aborted as an error if a conflict in type is found in any of the variables. The compiling is successfully completed if no conflict is found in all the variables. After compiling, one of the executable forms is executed. As part of execution, a program in an executable form is compiled and converted into a machine language (binary) which is compatible with the computer using the program. The machine language is a language directly interpretable and executable by a CPU. In the static language, data to be processed needs to be declared, meaning the data must be classified into types such as numeric, text, and composite types. If a text type (string) data is used as a numeric type without declaration, an error results at the time of compiling.

In contrast, the dynamic language is a language which allows a method or a variable (a symbol) to be dynamically deleted or added from or to a class at the time of execution. Since data types do not need to be declared in a program in the dynamic language, the program is not checked in terms of data types and therefore no conflict in type errors are triggered before execution. As described above, the dynamic language does not require a specific type to be set for data to be processed, and thus can more flexibly respond to changes than the static language. Moreover, the dynamic language has advantages over the static language in that the code in the dynamic language is smaller in volume and easier to read. From these, the dynamic language exhibits high development efficiency and thus has been used for large-scale systems in recent years.

As a programming technique for description in such a programming language, object-oriented programming have been increasingly employed in which data and procedures (methods) for operating the data are set as units called objects and a program is described by combining the objects. During the execution of the program described by this object-oriented programming, accesses are frequently made to methods configuring objects and variables (symbols) assigned such unique names that data can be stored and made available for a certain period.

In recent years, increase in processing speed by executing the program largely depends on increase in the speed of acquisition of values stored in the symbols. Thus, the acquisition is desired to be speeded up. However, wide use of the dynamic language slower than the static language prevents the speeding-up of the acquisition. This is because the static language allows the acquisition by use of a single memory access instruction, while the dynamic language in major implementation forms requires hash table access for the acquisition, and cannot avoid increase in memory accesses.

In the static language, a symbol name is converted into an offset value on a memory (offset_x) at the time of compiling or first execution of a program. Accordingly, in the static language, a program as shown in FIG. 1(a) is described in the code shown in FIG. 1(b). The code includes only an instruction to: read 64 bits from an address obtained by adding a constant offset_x to the content of the register r10; and then to assign the 64 bits to r31. Here, the 64 bits means that int (integer type) has a 64 bit value. As described above, the static language is capable of getting a value stored in the symbol by using only one instruction. Note that the 64 bits are read in the above description, but 32 bits can be read and assigned in a case of a variable indicating a 32-bit value.

In the dynamic language, symbol names as "key" and their values as "value" are stored in a symbol table (an open hash table, for example), and the symbol table is used for accessing each symbol. Accordingly, in the dynamic language, the program shown in FIG. 1(a) is described in the code as shown in FIG. 1(c). The code includes: an instruction to assign an integer value indicating a symbol x to r3; and an instruction to call a method of get_symbol( ) to get a value stored in the symbol in accordance with the r3, and then to assign the value to the r31. In the dynamic language, the value stored in the symbol is gotten by executing multiple instructions as described above. For this reason, memory accesses are increased and accordingly the acquisition of the value stored in the symbol needs longer time than in the static language. Note that ld and li in FIGS. 1B and 1C are assemblers for PowerPC, respectively.

For such hash table access, some techniques of speeding up access to symbols have been proposed. For example in Lua-JIT User's Group post of November 2009, M. Pall (herein "Pall") discloses speeding-up is achieved in the case of hash slot specialization using an HREFK instruction in the following manner: if a hash key does not match "key," processing is terminated; if the hash key matches "key," a value corresponding to the hash key is loaded, or the value is stored.

In "A Practical Solution for Scripting Language Compilers" by Biggar el al. (herein "Biggar") speeding-up is achieved by calculating a hash value at the time of compiling rather than at the time of execution. In addition, if it is statically ensured that a specific function does not generate code at the time of execution, a symbol table is deleted, and a value is directly accessed in the generated code.

In Japanese Patent Application Publication No. 2002-132521, a program loader decides allocated addresses of symbols in a re-locatable object file transferred to a RAM from a host system, based on load address information of each of the symbols, and performs an inter-symbol hook processing based on hook information. Furthermore, by providing the program loader with a creating function of default symbols, fine symbol allocations of all the symbols are performed on a target system, and debugging efficiency are improved.

Japanese Patent Application Publication No. 2004-62552 proposes changing the execution order of an instruction in order to optimize a program and achieve high speed processing. For example, a first instruction having a possibility to raise an order exception is detected; a second instruction which is to be executed prior to the first instruction and assures that no exception of the first instruction occurs is detected; the position of the first instruction in the execution order is changed so that the first instruction can be executed after the second instruction but before a conditional branch instruction for selectively executing the first instruction. This enables a compiler to start in advance the execution of memory access (or the like requiring a substantially long processing time) thereby accelerating the processing of the optimization target program.

The technique described in Pall above has a problem that, when no specialization is made by the HREFK instruction, the access is performed in the conventional slow manner.

In the technique described in Biggar, since the hash value is calculated in advance, the processing speed can be increased, but the technique cannot cope with a case where the symbol is deleted at the time of execution. In addition, since the symbol table is deleted, the technique cannot cope with a case where only part of the program does not need access to the symbol table.

Without using a special system, the system and the method described in JP 2002-132521 are capable of allocating the symbol at an address on a target system specified by the user, and preventing the system from running out of control even if the address resolutions are made for not all the symbols at the time of execution. However, this technique is not intended to increase the speed of accessing the symbol.

Furthermore, the system and the method described in JP 2004-62520 are capable of optimization by controlling the execution order of instructions with use of a dummy instruction, by deleting a redundant instruction, and by moving a memory access instruction for reading an invariable value in a loop to the outside of the loop, as well as changing the execution order of an instruction which may raise an exception. However, this technique is either not intended to increase the symbol access speed.

For these reasons, there is a need of a system and a method capable of increasing the processing speed of a program described in the dynamic language by increasing the access speed of frequent accesses to symbols during the execution of the program.

SUMMARY OF INVENTION

In view of the above problems, the present invention has a configuration in which the same behavior (specifically, exception occurrence) as before optimization is guaranteed in the following manner. When a symbol is accessed, access to a symbol table is made only the first time, the symbol table being configured in such a manner as not to change an address of an entry (combination of key which is a symbol name and a value) corresponding to the symbol. Thereafter, accesses to the symbol table are replaced with accesses to the entry. When the replacement is performed, appropriate processing is performed in five operations such as generating code, generating a symbol, deleting the symbol, reading a value in the symbol, and writing the value in the symbol, so as to reduce overhead in executing watch code for checking whether or not a symbol is present.

As described above, access to the symbol table is made only the first time, and thereafter access is made to the entry, so that the symbol can be accessed. This leads to access with light overhead. In addition, such appropriate processing is performed that the aforementioned watch code is generated at the time of deletion of the symbol so as to guarantee the same behavior as before the optimization. Thereby, the watch code can be generated at a low cost, the overhead in executing the watch code can be reduced, and the symbol access speed in the dynamic language can be increased.

As a system capable of performing the appropriate processing described above and increasing the symbol access speed, the present invention provides an optimization system for optimizing a program described in a dynamic language. This system includes: a range identifying unit that interprets the program, and thereby identifies a range including a group of instructions accessing a variable (symbol) in the program, as a range by which the access to the symbol can be commonized; an instruction generating unit that generates a plurality of instructions optimized based on a plurality of instructions included in the identified range, the plurality of optimized instructions including an instruction to access a symbol table, in which a key for identifying each symbol and a value object to be stored in the symbol are stored in association with each other, by using the key for identifying the symbol to be accessed by the group of instructions included in the identified range, to get an address of a symbol entry in which the address of the value object to be stored in the symbol corresponding to the key is held, and to store the gotten address in an address storage unit; an instruction extracting unit that fetches the instruction from the identified range one by one; and an instruction judging unit that determines whether each of the fetched instructions is an instruction to access the symbol.

If the instruction judging unit determines that the fetched instruction is an instruction to access the symbol, and if the symbol is present when generating an instruction to access the symbol, as an optimized instruction, on the basis of the fetched instruction by using the address of the symbol entry stored in the address storage unit, the instruction generating unit generates the instruction allowing checking whether the symbol is present or not quickly. By performing appropriate processing to generate such an instruction and optimizing the program, the symbol access speed can be increased.

Optimization processing of the program can be performed when any of the following operations occurs: generating code during compiling; generating a symbol during execution of the generated code; deleting the symbol; reading the value object stored in the symbol; and writing the value object to the symbol.

The instruction to access the symbol is any one of an instruction to read the value object stored in the symbol, an instruction to write the value object to the symbol, and an instruction to delete the symbol. Operation instructions such as adding up two values and method execution instructions do not require access to a symbol, and thus do not fall under the instruction to access a symbol. These instructions are generated by conventionally known instruction generation processing.

The optimization system further comprises a symbol judging unit that determines whether or not the symbol is present, wherein when the symbol judging unit determines that the symbol is not present, the instruction generating unit generates an instruction (the watch code described above) to check whether or not the symbol is present and an instruction to raise an exception for a case of absence of the symbol. In a case where the symbol is not present such as a case where the symbol is deleted or the like, the exception can be raised without fail. Only in the case where the symbol is not present, the watch code is executed. Thus, the symbol access speed can be increased.

If the symbol fetched by the instruction extracting unit is the instruction to delete the symbol, the instruction generating unit generates an instruction to replace the address of the value object held in the symbol entry stored in the address storage unit with an invalid address. If the address is replaced with the invalid address, the invalid address is read in next reading of the address of the value object. The reading of the invalid address raises an exception. This ensures that an exception occurs without fail when the symbol is not present. When being present, the symbol is not replaced with the invalid address. Thus, an access to the symbol can be made immediately by using the address of the symbol entry.

When generating the instruction to access the symbol by using the address of the symbol entry stored in the address storage unit, the instruction generating unit generates the instruction in the following manner. If the fetched instruction is the instruction to read the value object in the symbol or the instruction to write the value object to the symbol, the instruction generating unit generates an instruction to compare the address gotten by the access object with 0, the address being of the value object stored in the symbol. If the fetched instruction is the instruction to delete the symbol, the instruction generating unit generates an instruction to assign 0 to the address of the value object. If the symbol is present, the comparison is made between 0 and the read address of the value object quickly. Since the read address is not 0, the processing can move to execution of the next instruction. If the symbol is not present, the comparison is made quickly. Since the two to be compared have 0, an exception occurs. This can ensure an exception occurrence without fail.

If the fetched instruction is the instruction to delete the symbol, the instruction generating unit generates an instruction to assign a value for executing a handler for raising an exception in reading to the value of the address of the value object. Also in this case, if the symbol is present, the address of the value object is different from the value for executing the handler, and thus the handler is not executed. If the symbol is not present, the value for executing the handler is read, and thus the handler is executed. This can ensure the exception occurrence without fail.

In addition to the optimization system described above, the present invention also provides an optimization method performed in the optimization system. The method includes the steps of: interpreting the program, and thereby identifying a range including a group of instructions accessing a variable (symbol) in the program, as a range by which the access to the symbol can be commonized; generating an instruction to access a symbol table, in which a key for identifying each symbol and an address of a value to be stored in the symbol are stored in association with each other, by using the key for identifying the symbol to be accessed by the group of instructions included in the identified range, to get an address of a symbol entry in which the address of the value object to be stored in the symbol corresponding to the key is held, and to store the gotten address in an address storage unit; fetching the instructions from the identified range one by one; judging whether each of the fetched instructions is an instruction to access the symbol; and if it is determined that the fetched instruction is an instruction to access the symbol, and if the symbol is present at the occasion of generating an instruction to access the symbol, as an optimized instruction, on the basis of the fetched instruction by using the address of the symbol entry stored in the address storage unit, generating the optimized instruction allowing an access to be made to the symbol immediately without checking whether the symbol is present or not.

The present invention can provide a computer-readable compiler program for implementing the method. The compiler program can be stored in a recording medium such as a CD-ROM, a DVD-ROM or an SD card, and thus be provided therein. The compiler program is executed by being read by a computer such as a PC, and thereby can cause the computer to function as the optimization system.

BRIEF DESCRIPTION OF DRAWINGS

FIGS. 1(a-c) exemplify a program at various stages in an embodiment of the invention; FIG. 1(a) illustrates a program at the starting point of a method according to an embodiment of the invention; FIG. 1(b) exemplifies a converted program in a static language according to an embodiment of the invention; FIG. 1(c) exemplifies a converted program in a dynamic language;

FIG. 3(a) illustrates an original program and FIG. 3(b) illustrates a program converted by a conventional compiler.

FIG. 5(a) illustrates a program and FIGS. 5(b) and 5(c) each illustrate an embodiment of a program optimized by being rewritten by the optimization system according to an embodiment of the invention;

FIG. 8 illustrates another embodiment of a program optimized by being rewritten by the optimization system according to an embodiment of the invention;

FIG. 11 illustrates a further embodiment of a program optimized by being rewritten by the optimization system according to an embodiment of the invention;

FIG. 14 illustrates a yet another embodiment of a program optimized by being rewritten by the optimization system according to an embodiment of the invention;

DETAILED DESCRIPTION OF THE PREFERRED EMBODIMENTS

Figure 2:
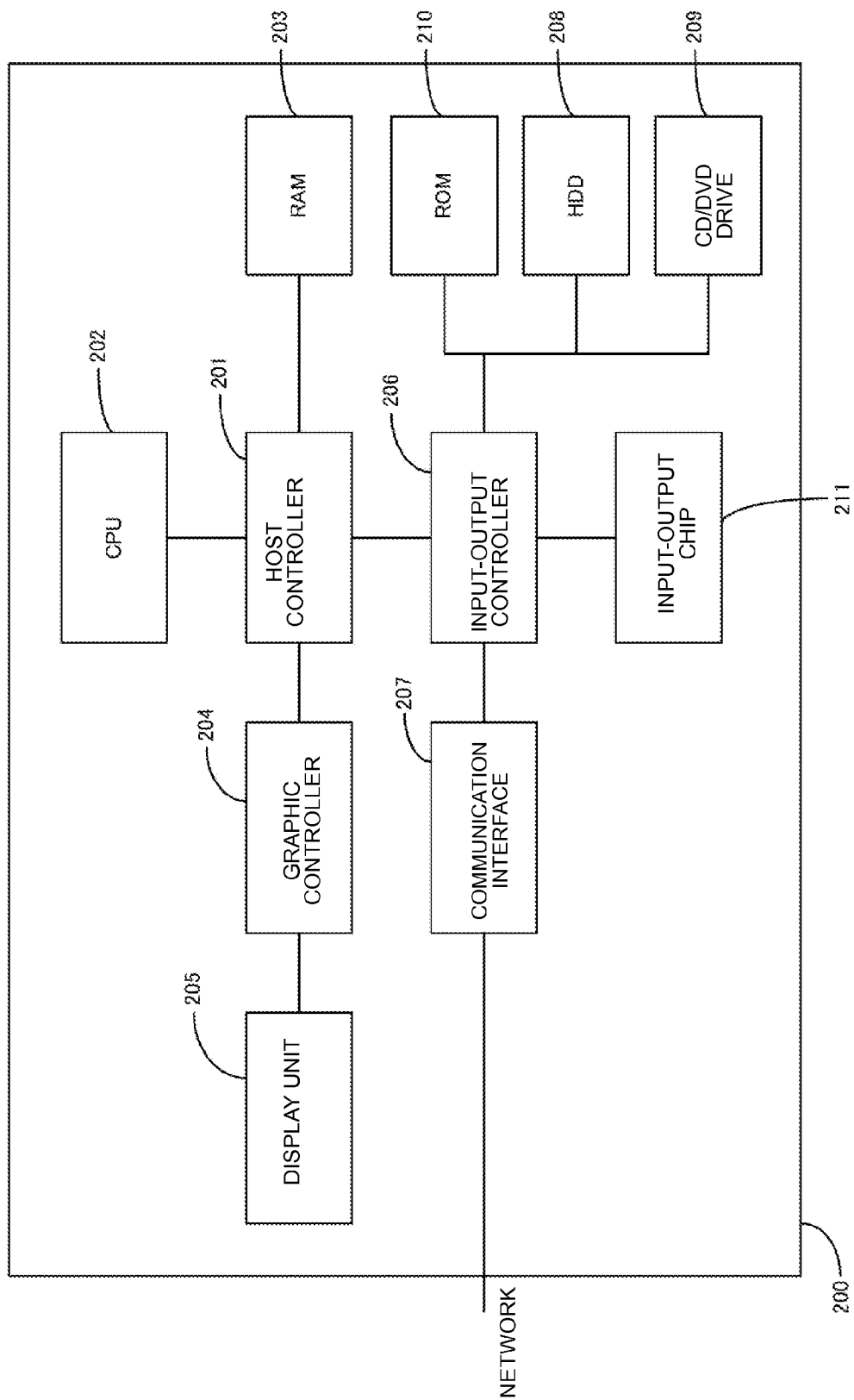
FIG. 2 illustrates a hardware configuration of an optimization system according to an embodiment of the invention.

The present invention will be described below by using concrete embodiments shown with reference to the drawings, but is not limited to the embodiments to be described later. FIG. 2 exemplifies a hardware configuration of an optimization system of the present invention. An optimization system 200 is a system that converts a source program into computer-executable execution code in the following manner. Specifically, the optimization system 200 receives a source program from an external system. Then, the optimization system 200 converts the source program in a predetermined manner into an intermediate representation such as byte code for Java (registered trademark) or byte code for a dynamic language such as Python (registered trademark) or Ruby (registered trademark). If the dynamic language is JavaScript (registered trademark) or the like, the optimization system 200 parses the source program itself to generate computer-executable code. The optimization system 200 generates an optimized program in generating the code, and rewrites the program in executing the code and generates new code. The optimization system 200 enables the generated code to be executed.

The optimization system 200 may be a system capable of storing therein a compiler program for implementing the aforementioned processing and executing the compiler program. A PC, a server, a workstation or the like may be used as the optimization system. Note that the aforementioned external system may be, for example, a PC or the like connected to the optimization system 200 via a network or the like.

The optimization system 200 includes as hardware: a CPU 202 mutually connected with a host controller 201; a RAM 203; a peripheral device including a graphic controller 204 and a display unit 205; a communication interface 207 connected to the host controller 201 via an input-output controller 206; an input-output device including a hard disk drive (HDD) 208, a CD/DVD drive 209, and the like; a ROM 210 connected to the input-output controller 206; and a legacy input-output device including an input-output chip 211. In addition, the optimization system 200 may include an SD card reader or the like that reads a program and data stored in an SD card used as one of recording medium.

The host controller 201 connects with each other the RAM 203 and the CPU 202 and the graphic controller 204 which access the RAM 203 at a high transfer rate. The CPU 202 operates based on the aforementioned compiler program and the like stored in the ROM 210 and the RAM 203 and controls various units. The graphic controller 204 gets image data generated on a frame buffer in the RAM 203 by the CPU 202 and the like and displays the image data on the display unit 205. The graphic controller 204 may include the frame buffer in the graphic controller 204, the frame buffer being for storing the image data generated by the CPU 202 and the like.

The input-output controller 206 connects the host controller 201 with the communication interface 207, the HDD 208 and the CD/DVD drive 209 which are relatively high-speed input-output devices. The communication interface 207 communicates with another system via the network. The HDD 208 can store the aforementioned compiler program, other programs, and various data. When being recorded in a CD-ROM or a DVD, the aforementioned compiler program, the other programs, and the various data can be read and provided by the CD/DVD drive 209 for the input-output chip 211 via the RAM 203.

The input-output controller 206 is connected to the ROM 210, the input-output chip 211, and the like which are relatively low-speed input-output devices. The ROM 210 stores a boot program for loading the OS from the HDD 208 and starting the OS, firmware in which initial setting information and the like for the computer and the equipment are recorded, and the like. The input-output chip 211 is connected to an input-output device of a corresponding one of the various units via a parallel port, a serial port, a keyboard port, a mouse port, or the like.

The compiler program is stored in a recording medium such as a CD-ROM, a DVD or an SD card and provided for a user. The compiler program is read from the recording medium, installed on the HDD 208 or the like via the input-output controller 206, and read and executed by the CPU 202. The compiler program is not limited to this, and may be stored in an HDD or the like of a server connected to a network, be read from the HDD or the like of the server, and then be executed.

The source program might be written in a static language such as C, C++, Java (registered trademark), or in a dynamic language such as PHP, Ruby (registered trademark), Python (registered trademark), JavaScript (registered trademark). Recently, the dynamic language is used also in a large-scale system due to its high development efficiency.

However, as described above, the dynamic language requires multiple instructions in memory access unlike the static language and thus has the problem of lowered access speed. This is because the static language allows direct access to a certain address on the memory, but the dynamic language involves access to a hash table. The hash table has sets (entries) of a hash key and a value. A hash value is calculated by applying a hash function to the key, and then the value can be gotten by reading an entry stored in the hash value.

If access is made to the hash table for an access to a symbol, the processing speed is lowered. Thus, the lowering of the processing speed can be prevented by reducing the number of accesses to the hash table. In the present invention, access to the same symbol is limited by using implementation in which an address of an entry corresponding to the symbol is not changed. For example, access to an open hash table is made only the first time, and subsequent accesses to the symbol are replaced with accesses to the entry.

Specifically, an optimized program as shown in FIG. 3($b$) can be generated from an original program shown in FIG. 3($a$) which is a source program or a pre-conversion program in an intermediate representation. The original program shown in FIG. 3($a$) describes multiple instructions requiring an access to a symbol "x" of an object "a", such as an instruction to assign a value of the symbol "x" of the object "a" to a variable i (i=a·x). The compiler interprets and optimizes this and generates code thereafter. A program generated at the time of the optimization generates an instruction as shown in FIG. 3($b$). Specifically, in the instruction, a range (here, from i=a·x to k=a·x) including instructions to access the symbol "x" of the same object "a" is identified as a range by which the access to the symbol "x" can be commonized (hereinafter, referred to as a "symbol-access-commonizing-allowing range"). A hash entry which manages the symbol "x" of the object "a" is gotten in the range. Then, a value of the entry is assigned to _Entx which is an address storage unit for storing an address.

"Entry" is defined as a structure capable of storing multiple values together. Since a value can be stored in _Entx of "Entry," _Entx functions as the aforementioned address storage unit. A get_symbol_entry( ) is a function to return an address of an entry of the symbol table. The symbol table is accessed only the first time by get_symbol_entry( ) and thereafter accesses can be made to the entry by using the address stored in _Entx.

The aforementioned i=a·x is replaced with i=_Entx→val which is an instruction to read the value in the entry. However, if the symbol corresponding to the entry is deleted, the entry is also deleted. Simply replacing the instruction does not raise an exception appropriately. For this reason, the value in the entry is read, and it is determined if the value is Null. If it is Null, an instruction to raise an exception is generated and then the original instruction is replaced with the instruction thus generated. As described above, watch code is provided by which whether or not an entry is Null is checked every time a value is read from the entry and a value is written to the entry. The provision ensures that an exception is raised without fail when the exception should be raised. If the variable corresponding to the entry is deleted, Null is assigned to _Entx→val, so that it is ensured that the instruction raises an exception without fail.

However, since the value in the entry is read every time it is needed and is determined to be Null in such code, the code can achieve high-speed processing to only a limited extent. This is because, if the value in the entry is present, the reading of the value in the entry and judging whether or not the value is Null are performed even though they are unnecessary processing.

Hence, in the present invention, instructions to perform appropriate processing are generated for instructions to access a symbol, specifically, instructions to read and write a value of the symbol, an instruction to delete the symbol, and thereby such unnecessary processing is eliminated, so that high-speed processing in execution of a program is achieved.

Concrete examples of the aforementioned appropriate processing include the following processing (1) to (4).

(1) The frequencies of checking the necessity of exception occurrence are reduced by rewriting code in the execution.

(2) Triggered by memory access in the execution, processing for the exception occurrence is performed.

(3) An instruction executable at a low cost is utilized for checking the necessity of the exception occurrence.

(4) Processing for exception occurrence is performed when a special value is read.

Employing such processing can replace the hash table access with access with lighter overhead, the hash table access including a loop to be executed an uncertain number of times and being likely to cause a cache miss. Thus, the overhead at the time of executing the watch code can be reduced. As the result, the symbol access speed in the dynamic language can be increased.

Figure 4:
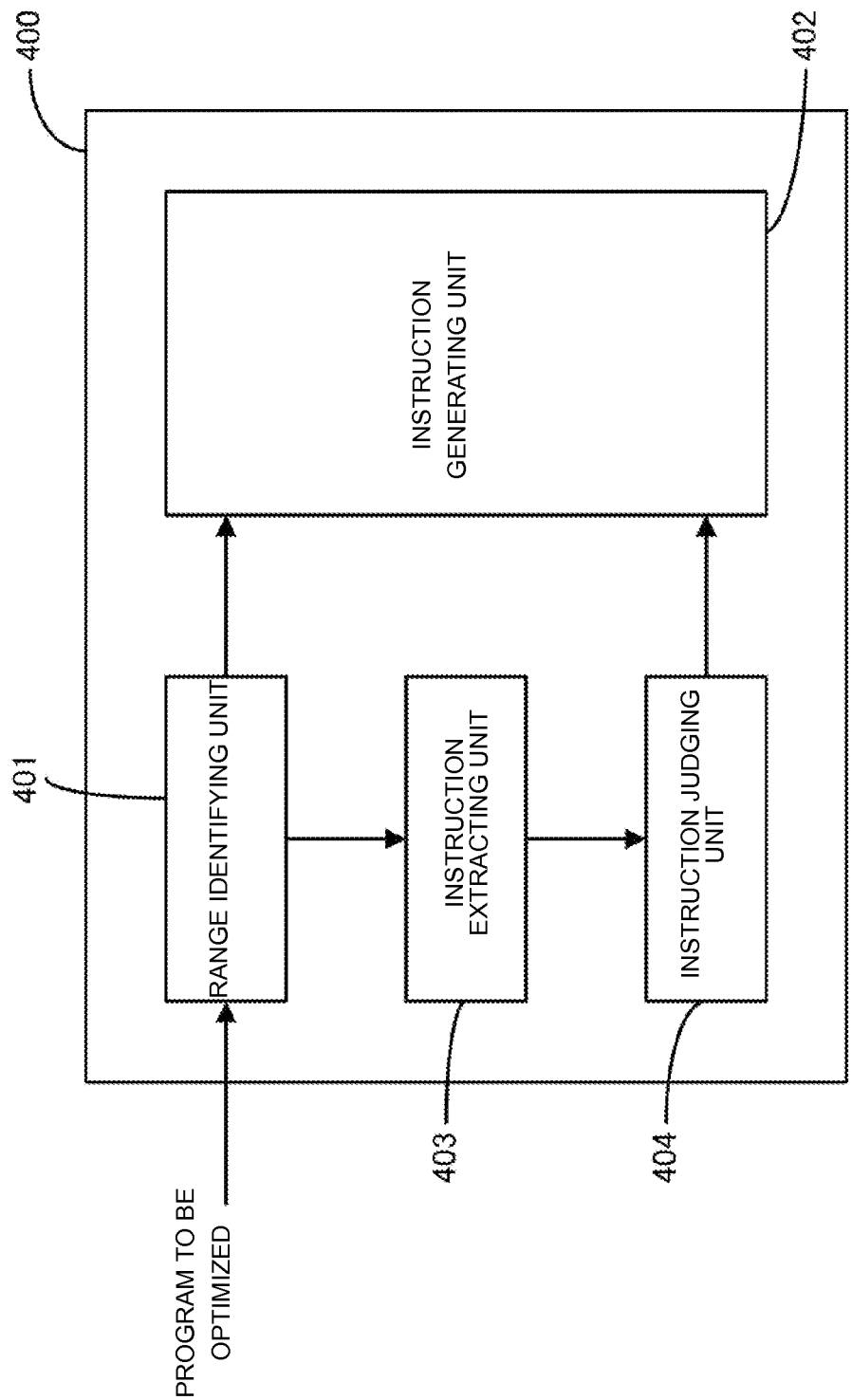
FIG. 4 illustrates a functional block diagram of an optimization system according to an embodiment of the invention.

FIG. 4 illustrates a functional block diagram of an optimization system for implementing the method. A system 400 has a hardware configuration shown in FIG. 2 and includes units cause to function when the CPU 202 executes the compiler program stored in the ROM 210 and the RAM 203.

The system 400 includes a range identifying unit 401, an instruction generating unit 402, an instruction extracting unit 403, and an instruction judging unit 404. The range identifying unit 401 interprets the program and identifies a range including a group of instructions accessing the same symbol in the program, as a symbol-access-commonizing-allowing range.

As shown in FIG. 3(a), a range is identified in which instructions to access the symbol "x" of the same object "a" is included. In other words, a range from i=a·x to k=a·x in which the same symbol "x" is used for reading and writing is identified in a program described so that instructions can be placed line by line. Any conventionally known method and range identification program may be employed to identify such a range. Processing of the instructions in the range can be implemented in the following manner, even though an access is not made to the symbol table. Specifically, the symbol table is accessed only the first time; an address of a corresponding entry is gotten; the gotten address is assigned to _Entx; and the address of the entry in _Entx is used to read a value in the entry or write a value to the entry.

The instruction generating unit 402 generates multiple instructions optimized based on multiple instructions included in the identified range. The optimized instructions include an instruction to access the symbol table in which a key for identifying each of symbols such as a method and a variable to be accessed and an address of the value object to be stored in the symbol are stored in association with each other, by using the key for identifying the symbol to be accessed by the group of instructions included in the range identified by the range identifying unit 401, to get an address of a symbol entry in which the address of the value object to be stored in the symbol corresponding to the key is held, and to assign the gotten address to _Entx.

The instruction extracting unit 403 fetches the instructions included in the range identified by the range identifying unit 401 one by one, after the instruction generating unit 402 generates the aforementioned instruction to assign the gotten address to _Entx for the first time. The instructions can be fetched one by one in the order of description in the program. The instruction judging unit 404 determines whether or not each of the instructions fetched by the instruction extracting unit 403 is any one of the instructions to access the symbol, specifically, an instruction to read the value object which is the value in the symbol, an instruction to write a value to the value object in the symbol, or an instruction to delete the symbol. Other instructions for operations such as addition, subtraction, multiplication, and division and instructions for method invocation are not the instruction to access the symbol, because each of the instructions uses a corresponding value read by the read instruction and thus does not involve a symbol access.

If the instruction judging unit 404 determines that the fetched instruction is the instruction to access the symbol, the instruction generating unit 402 generates the optimized instruction allowing an access to be made to the symbol as an optimized instruction, on the basis of the fetched instruction by using the address of the symbol entry stored in _Entx. As described above, using the address of the symbol entry in _Entx makes it possible to reduce accesses to the symbol table. If the symbol is present at the occasion of generating the instruction to access the symbol, the instruction generating unit 402 generates the instruction allowing an access to be made to the symbol immediately without checking whether the symbol is present or not. If the symbol is present, reading or writing of the value from or to the entry can be performed, and thus checking is not required. By omitting such checking processing, high-speed processing can be achieved. Moreover, an instruction string by which checking the presence of the symbol is speeded up is generated, and thereby the high-speed processing can be achieved.

If the symbol is present, the optimization system of FIG. 4 generates an instruction to omit checking whether the symbol is present or not, generates code directly executable by the CPU from the program including the generated instruction, executes the code, and thereby achieves the high-speed processing. In generating the instruction, performing appropriate processing of any one of (1) to (4) above can reduce the overhead at the time of execution of the watch code, so that the symbol access speed can be increased. The appropriate processing will be described in detail below. Note that the processing is provided for an exemplary purpose, and processing for increasing the access speed is not limited to the processing.

In (1) above, in any of cases where a source program is interpreted and it is found that a symbol is present at the time of code generation, where a symbol is generated during the execution of the code, and where reading or writing of a value (value object) from or to the symbol is performed, it is clear that the value is present in the symbol. Accordingly, watch code is not generated. Only in cases where the symbol is not present and the symbol is deleted, is watch code generated. For example, suppose a case where an original program is a program as shown in FIG. 5(a). If the symbol is present, NOP indicating no operation to be performed and an instruction i=_Entx→val are generated, as shown in FIG. 5(b).

NOP is placed as a dummy in a location where an instruction is to be added later and enables replacement of an instruction to be performed if the symbol is deleted later. In addition, i=_Entx→val is a statement using an arrow operator (→) and means that the value is accessed by a pointer and assigned to a variable i. As described above, each of multiple instructions identified as in a symbol-access-commonizing-allowing range is replaced with NOP and _Entx→val. Note that the description has been given by using NOP, but replacement is not limited thereto. It is also possible to use a JUMP instruction for jumping to a specific instruction location.

In the cases where the symbol is not present and where the symbol is deleted, watch code judging whether _Entx→val is Null is generated as shown in FIG. 5(c). If _Entx→val is Null, an instruction to raise an exception is also generated. In FIG. 5(c), the judgment is made by directly reading a value in an entry by _Entx→val. Incidentally, if the symbol is deleted, Null is assigned to _Entx→val.

The processing will be described in detail by referring to a flowchart shown in FIG. 6. The processing is started from Step 600. In Step 601, the source program is interpreted by the compiler program, and a symbol-access-commonizing-allowing range is identified as a range in which reading, writing, and the like from and to the same symbol in the same object are performed.

In Step 602, an instruction to get a hash entry managing the symbol "x" of the object "a" and to assign a value therein to _Entx is generated. In other words, Entry*_Entx=get_symbol_entry(a,"x"); is generated.

In Step 603, one instruction is fetched from instructions described in the identified commonizing-allowing range. The instructions can be fetched one by one from the first one in the range, for example.

Next, in Step 604, it is determined whether or not all the instructions in the range are fetched and thus there is no instruction in the range. If there is no instruction, there is no instruction to be processed. Thus, the processing proceeds to Step 622 and then exits.

If there is any instruction, the processing proceeds to Step 605. In Step 605, it is determined whether or not the fetched instruction is the instruction to read an object in the symbol, which is the instruction to access a symbol. Specifically, it is determined whether or not the fetched instruction is such an instruction as i=a·x. If the instruction is the read instruction, it is determined in Step 606 whether or not an address of a value object held by a symbol entry is Null. If the address is Null, the symbol is not present. If the address is not Null, the symbol is present.

If the address of the value object of the symbol entry is not Null, the processing proceeds to Step 607. In Step 607, any instruction to secure a location for later insertion of an instruction, for example, NOP is generated, and an address thereof is registered. If NOP is changed to another instruction, an access is made to the address, and the instruction is registered with the address, so that NOP can be replaced with the instruction.

If the address is Null, the processing proceeds to Step 608. In Step 608, an instruction to check whether or not the address is Null and related to processing to be executed in the case of Null (exception occurrence, for example) is generated. In other words, after the instruction is generated in Step 607 or 608, the processing proceeds to Step 609, if(_Entx→val==NULL) throw noEntryException is generated. In Step 609, an instruction is generated by which a value is fetched from Entx→val and assigned to the variable i (i=_Entx→val;). Then, the processing returns to Step 604 to fetch the next instruction.

If it is determined in Step 605 that the fetched instruction is not the instruction to read an object, in Step 610, it is determined whether or not the fetched instruction is the instruction to write an object in the symbol, which is the instruction to access a symbol. Specifically, it is determined whether or not the fetched instruction is such an instruction as a·x=123. If the instruction is the write instruction, it is determined in Step 611 whether or not an address of a value object held by a symbol entry is Null. If the address is Null, the symbol is not present. If the address is not Null, the symbol is present.

If the address of the value object of the symbol entry is not Null, the processing proceeds to Step 612. In Step 612, any instruction to secure a location for later insertion of an instruction, for example, NOP is generated, and an address thereof is registered. If NOP is changed to another instruction, an access is made to the address, and the instruction is registered with the address, so that NOP can be replaced with the instruction.

If the address is Null, the processing proceeds to Step 613. In Step 613, as similar in Step 608, an instruction to check whether or not the address is Null and related to processing to be executed in the case of Null (exception occurrence, for example) is generated. In other words, after the instruction is generated in Step 612 or 613, the processing proceeds to Step 614, an instruction (_Entx→val=obj;) of assigning the value object (obj) to _Entx→val is generated. Then, the processing returns to Step 604 to fetch the next instruction.

If the instruction is determined in Step 610 to be not the write instruction, either, it is determined in Step 615 whether or not the fetched instruction is the symbol deletion instruction which is the instruction to access the symbol. Specifically, it is determined whether or not the instruction is such an instruction as del=a·x. Incidentally, when being represented by a hash (hoge), a delete syntax in the dynamic language is, for example, "delete hoge" in JavaScript (registered trademark), "del hoge" in Python (registered trademark), "undef $hoge" in Perl (registered trademark), and "unset ($hoge)" in PHP. If the instruction is the symbol deletion instruction, it is determined in Step 616 whether or not an address of a value object held by a symbol entry is Null. If the address is Null, the symbol is not present. If the address is not Null, the symbol is present.

If the address of the value object of the symbol entry is not Null, the processing proceeds to Step 617. In Step 617, any instruction to secure a location for later insertion of an instruction, for example, NOP is generated, and an address thereof is registered. If NOP is changed to another instruction, an access is made to the address, and the instruction is registered with the address, so that NOP can be replaced with the instruction.

If the address is Null, the processing proceeds to Step 618. In Step 618, as similar in Step 608 and Step 613, an instruction to check whether or not the address is Null and related to processing to be executed in the case of Null (exception occurrence, for example) is generated. After the instruction is generated in Step 617 or 618, the processing method proceeds to Step 619. In Step 619, code to generate a check instruction (call InstUpdateHelper;) at the registered address is generated. Thereafter, the processing proceeds to Step 620, and an instruction of assigning NULL to _Entx→val is generated. Then, the processing returns to Step 604 to fetch the next instruction.

If the instruction fetched in Step 615 is not the symbol deletion instruction, either, the processing proceeds to Step 621. In Step 621, the source program is referred to, and thereby a corresponding instruction is generated by conventionally known instruction generation processing. Subsequently, the processing returns to Step 604 to fetch the next instruction. In this case, the fetched instruction is such an instruction that does not affect the high-speed processing. Examples thereof include operation instructions such as addition, subtraction, multiplication, and division and method execution instructions. These instructions can be the same as those described by the conventional description method.

Note that since NOP described above is generated and placed in the program, the instruction can be replaced with newly generated watch code. However, NOP does not necessarily have to be placed in the program. Another implementation may be provided in which NOP is not provided. Specifically, in the implementation, an instruction of the same kind of processing, that is, an instruction to override an instruction existing in a location for future watch code is generated in a different location. When the watch code is generated, the instruction in the different location is also executed.

Figure 6:
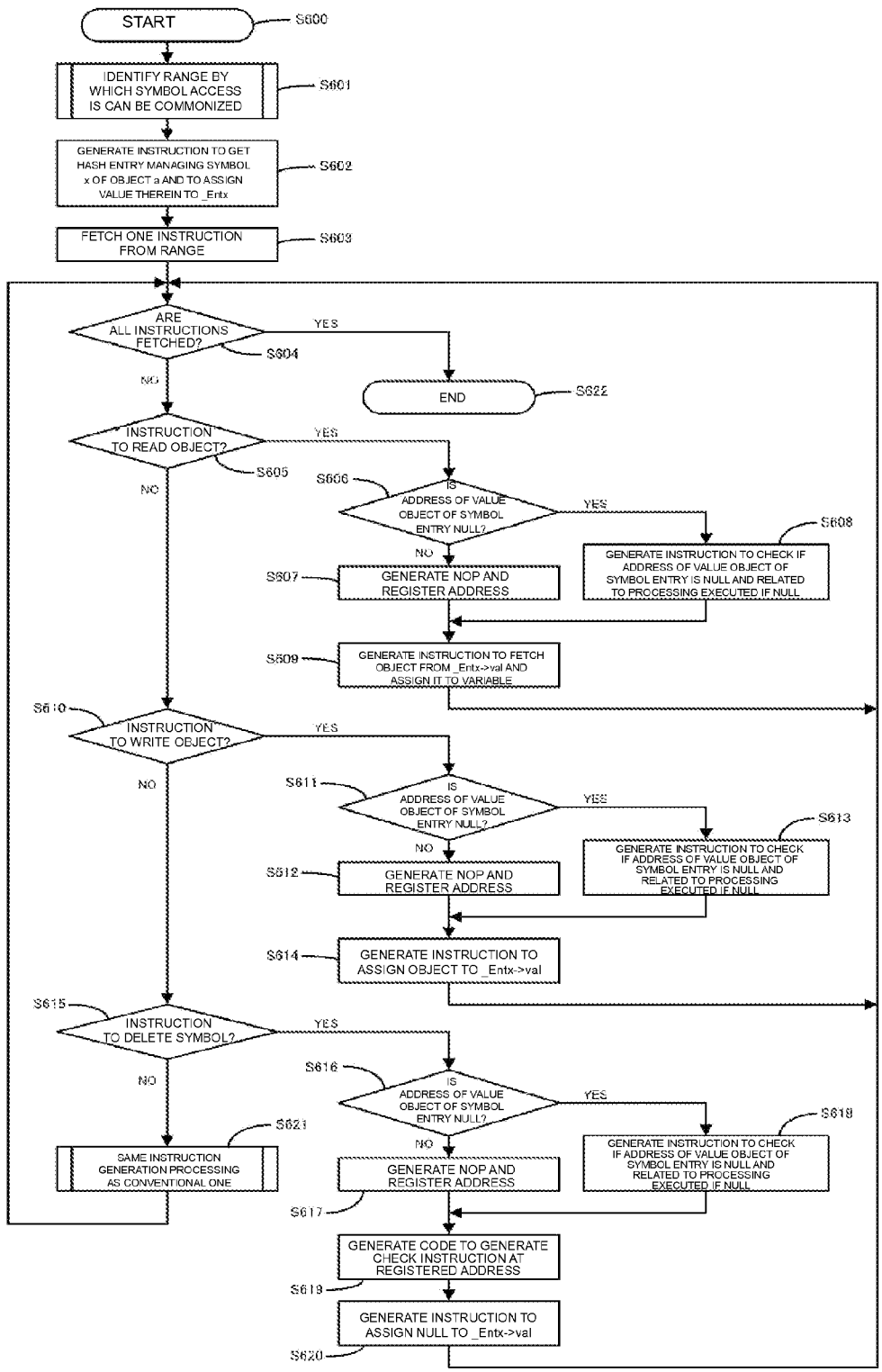
FIG. 6 is a flowchart illustrating the optimization processing according to an embodiment of the invention shown in FIGS. 5(b) and 5(c)
Figure 7:
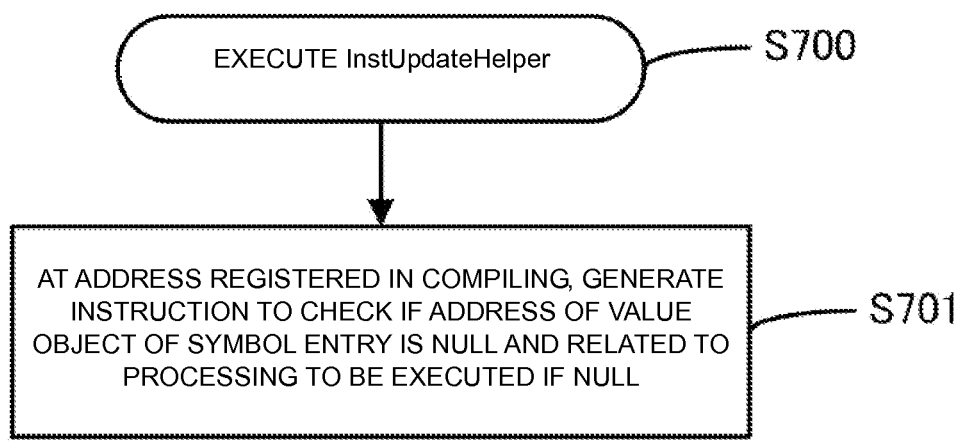
FIG. 7 illustrates a flow of processing which can occur in Step 619 of FIG. 6 according to an embodiment of the invention.

FIG. 7 is a flowchart showing the processing in Step 619 in FIG. 6. In Step 700, InstUpdateHelper is executed. In Step 701, an instruction to check the address of the value object of the symbol entry is Null and related to processing to be performed in the case of Null (exception occurrence, for example) is generated at the address registered in compiling. The instruction is the same as the instruction generated in Step 608 above or the like. After the generation, the processing returns to Step 604 shown in FIG. 6 to fetch the next instruction.

Next, a description is given of (2) above. In this processing, as shown in FIG. 8, when code is generated, a memory access instruction for Entx→val is generated in a location where a value is read or written from or to a symbol. If the symbol is generated at the time of code execution, an address of an object is registered and stored in _Entx→val. Then, such an address that raises a memory exception in the case of deletion of the symbol is generated and stored in _Entx→val.

In the case of reading or writing of the value from or to the symbol, a value in _Entx→val is read or written. If such an address that raises a memory exception has been stored therein at the time of accessing Entx→val, the address therein can be returned, so that a memory exception can be raised.

Specifically, as shown in FIG. 8, for del a·x. in the source program, an instruction Entx→val=0xbaadf00d to assign an invalid address is generated, and an instruction t=i→_type to read a field (_type) which is data in the object a is added to the line next to an instruction to read _Entx→val (i=_Entx→val;) Note that the invalid address is herein set as 0xbaadf00d to raise a memory exception, but is not limited to this.

If the symbol is deleted, 0xbaadf00d is assigned to _Entx→val. This means that 0xbaadf00d is assigned to the variable i and a variable j. The memory exception occurs when the memory address is read. Thus, by reading values of the variables i and j by pointers and by reading the field by the instruction added later to read the field, the memory exception can be raised.

Figure 9:
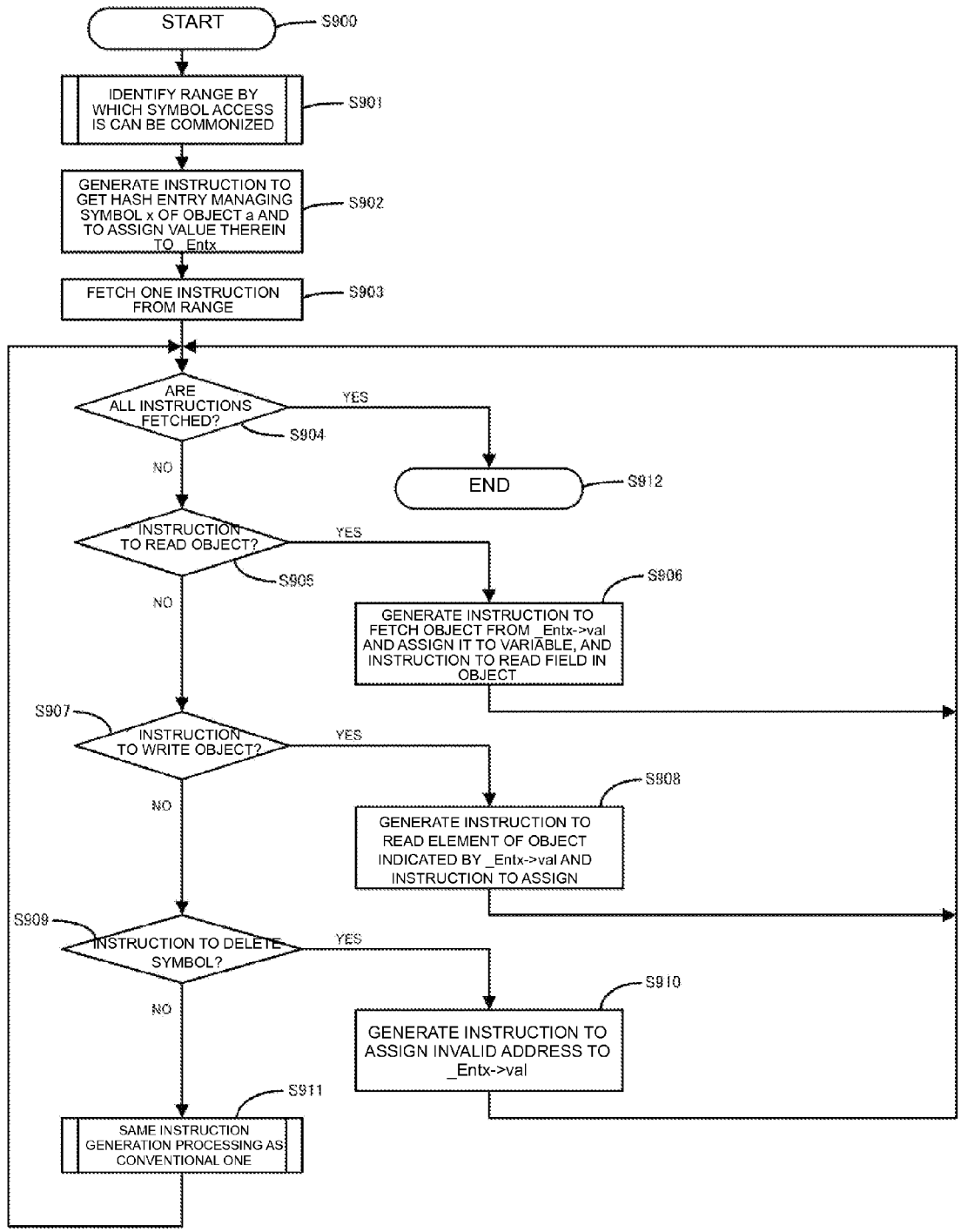
FIG. 9 is a flowchart illustrating a flow of the optimization processing according to an embodiment of the invention shown in FIG. 8.

The processing will be described in detail by referring to a flowchart shown in FIG. 9. The processing is started from Step 900. In Step 901, a symbol-access-commonizing-allowing range is identified.

In Step 902, an instruction to get a hash entry managing the symbol "x" of the object "a" and to assign a value therein to _Entx is generated. As described above, access to the symbol table is made only the first time, and thereafter the accesses to the symbol are replaced with accesses to the entry. This leads to accesses with light overhead and increases the access speed.

Next, in Step 903, one instruction is fetched from the identified range. Also in the similar manner as described above, instructions arranged in the identified range can be fetched one by one in order.

In Step 904, it is determined whether or not there is any instruction to be fetched in the range. If there is no instruction therein, the processing proceeds to Step 912 and then exits. On the other hand, if there is any instruction to be fetched, the processing proceeds to Step 905. In Step 905, it is determined whether or not the fetched instruction is the instruction to read an object in a symbol. In other words, it is determined whether or not the instruction is such an instruction as i=a·x. If the instruction is the read instruction, the processing proceeds to Step 906. In Step 906, instructions to fetch the object from Entx→val and to assign a value thereof to the variable i are generated. In addition, an instruction to read a field (_type) in the object is generated. This is because although 0xbaadf00d is assigned to _Entx→val in the case of the deletion of the symbol, reading an actual value is required to raise the memory exception. After the instruction is generated, the processing returns to Step 904 to fetch the next instruction.

If the fetched instruction is not the instruction to read the object in the symbol in Step 905, the processing proceeds to Step 907. In Step 907, it is determined whether or not the fetched instruction is the instruction to write the object to the symbol. In other words, it is determined whether the instruction is such an instruction as a·x=123. If the instruction is the write instruction, the processing proceeds to Step 908. In Step 908, an instruction to read an object element (_type) indicated by _Entx→val and an instruction to assign the object (obj) to _Entx→val are generated. By these instructions, the object element (_type) indicated by Entx→val is read and obj is written to _Entx→val, respectively. The instructions are provided for the following reason. If 0xbaadf00d has been stored in _Entx→val and _Entx→val is not read, a memory exception does not occur. Hence, a value therein is read first, it is made sure that a memory exception does not occur, and then the writing is performed. After the instructions are generated, the processing returns to Step 904 to fetch the next instruction.

If the fetched instruction is determined to be not the write instruction in Step 907, the processing proceeds to Step 909. In Step 909, it is determined whether or not the fetched instruction is the symbol deletion instruction. If the instruction is the deletion instruction, the processing proceeds to Step 910. In Step 910, an instruction to assign such an invalid address that raises a memory exception to _Entx→val is generated. In other words, the address is such an address that an exception occurs when the memory address is read. The address set herein is 0xbaadf00d. After the instruction is generated, the processing returns to Step 904 to fetch the next instruction.

If the fetched instruction is determined in Step 909 to be not the symbol deletion instruction, either, the processing proceeds to Step 911. In Step 911, the source program is referred to, and thereby processing of generating a corresponding instruction is performed. Subsequently, the processing returns to Step 904 to fetch the next instruction. In this case, the fetched instruction is such an instruction that does not affect the high-speed processing. Examples thereof include operation instructions such as addition, subtraction, multiplication, and division and method execution instructions. The instruction is generated by the conventionally known instruction generation processing.

Figure 10:
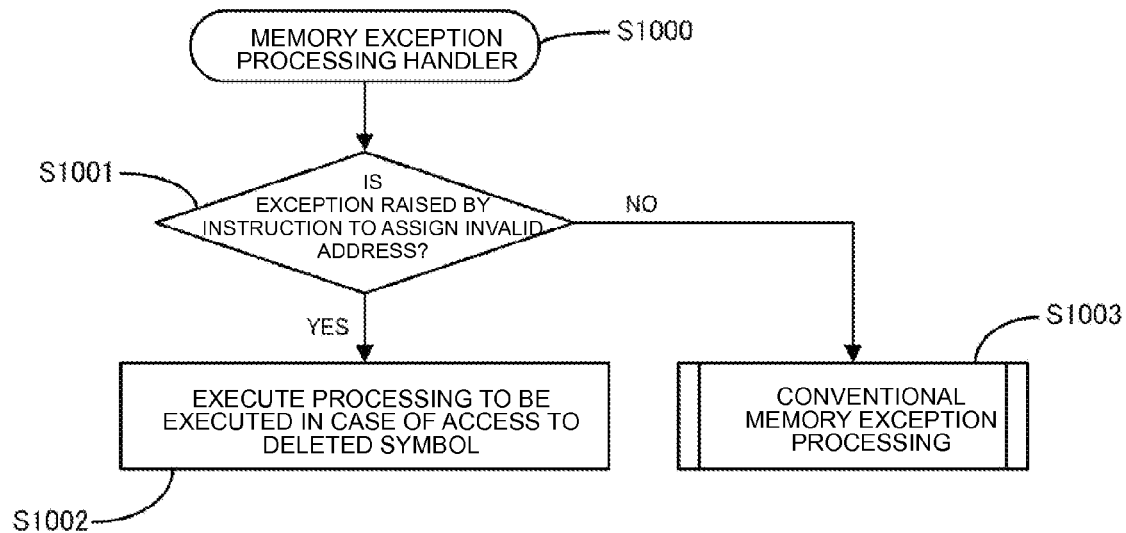
FIG. 10 illustrates a flow of processing which can occur in Step 910 of FIG. 9 according to an embodiment of the invention.

FIG. 10 is a flowchart showing a processing flow at the time of calling a memory-exception-processing handler. The processing is started from Step 1000. In Step 1001, it is determined whether or not the instruction which has raised the memory exception is a handler called as a result of assigning the invalid address generated in Step 910 in FIG. 9. If the instruction is the handler, the processing proceeds to Step 1002 to execute processing to be executed in case of access to a deleted symbol. Specifically, a handler which is "throw noEntryException" is executed. If the instruction is not the handler, the processing proceeds to Step 1003 to execute processing, such as forced termination, as conventional memory exception processing.

Next, a description is given of (3) above. As shown in FIG. 11, the following processing is performed at the time of code generation. Specifically, when a conditional branch is not taken, an instruction quickly executable is used, a value in _Entx→val is checked in a location where a value is read or written from or to a symbol, and processing to be executed at the time of absence of the symbol, that is, an instruction to raise an exception is generated. For example, the instruction corresponds to a "trap" instruction in PowerPC. The "trap" instruction causes the next instruction to be executed in one clock cycle when a conditional branch is not taken, but causes the processing to jump to a handler in several tens of clock cycles when the conditional branch is taken. Then, if the symbol is generated in the code execution, an address of an object is registered and stored in _Entx→val. Note that this processing is executed on condition that a processor implements an instruction quickly executable on an unbranched path.

When the value is read or written from or to the symbol, the value in _Entx→val is read or written, and the value is checked. If the symbol has been deleted, 0 is assigned to _Entx→val. This is performed for the following reason. A "trapi" instruction is one for making a comparison between the value and an immediate address by using the "trap" instruction. A comparison is made between 0 and 0, the condition is satisfied, and thus an exception is raised. The raising of the exception is a handler to be executed when the condition is satisfied.

Specifically, as shown in FIG. 11, for del a·x in the source program, code _Entx→val=0 is generated, and an instruction trapi eq,i,0 is added to the line next to an instruction to read _Entx→val (i=_Entx→val) The instruction makes a comparison between i and 0. If there is a match, the condition is satisfied, the processing jumps to the handler and an exception is raised.

The processing utilizes execution distribution in which symbol deletion seldom occurs. If the execution distribution is opposite to an ordinary one, the program is compiled again to make the conditional branch reversed.

Figure 12:
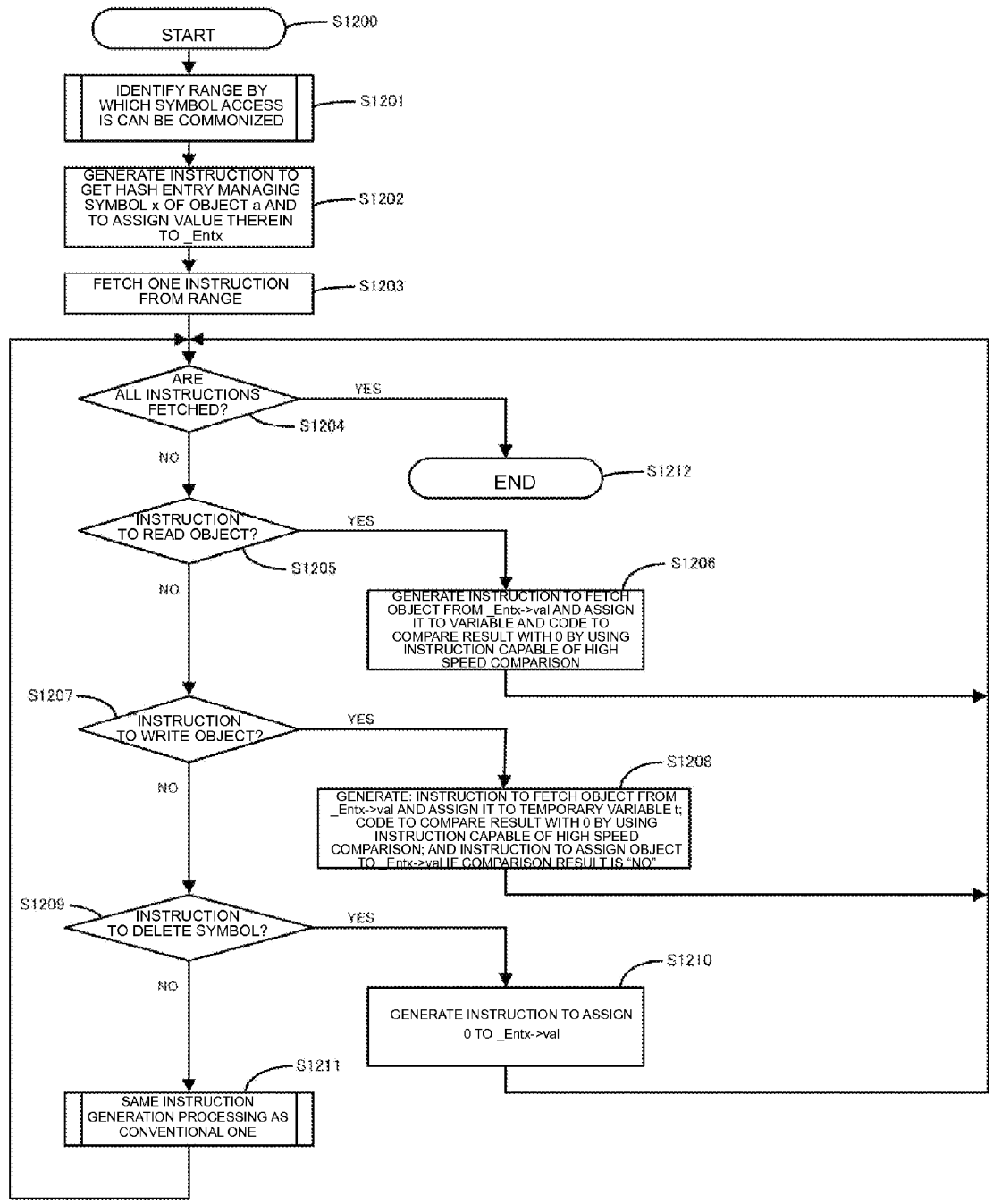
FIG. 12 is a flowchart illustrating a flow of the optimization processing according to an embodiment of the invention shown in FIG. 11.

The processing will be described in detail by referring to a flowchart shown in FIG. 12. The processing is started from Step 1200. In Step 1201, a symbol-access-commonizing-allowing range is identified.

In Step 1202, an instruction to get an address of a hash entry managing the symbol "x" of the object "a" and to assign a value therein to _Entx is generated. As described above, access to the symbol table is made only the first time, and thereafter the accesses to the symbol are replaced with accesses to the entry. This leads to accesses with light overhead and increases the access speed.

Next, in Step 1203, one instruction is fetched from the identified range. Also in the similar manner as described above, instructions arranged in the identified range can be fetched one by one in order.

In Step 1204, it is determined whether or not there is any instruction to be fetched in the range. If there is no instruction therein, the processing proceeds to Step 1212 and then exits. On the other hand, if there is any instruction to be fetched, the processing proceeds to Step 1205. In Step 1205, it is determined whether or not the fetched instruction is the instruction to read an object in a symbol. In other words, it is determined whether or not the instruction is such an instruction as i=a·x. If the instruction is the read instruction, the processing proceeds to Step 1206. In Step 1206, instructions to fetch the object from _Entx→val and to assign a value thereof to the variable i are generated. In addition, code is generated by which a result of the assignment is compared with 0 by using the instruction (trapi instruction) capable of comparing the result quickly. This is provided for the following reason. In the case of the deletion of the symbol, 0 is assigned to _Entx→val, and the comparison is made between 0 assigned and 0 described above. Since there is a match, the condition is satisfied, and thus the exception is raised. After the instruction is generated, the processing returns to Step 1204 to fetch the next instruction.

If the fetched instruction is not the instruction to read the object in the symbol in Step 1205, the processing proceeds to Step 1207. In Step 1207, it is determined whether or not the fetched instruction is the instruction to write the object to the symbol. In other words, it is determined whether the instruction is such an instruction as a·x=123. If the instruction is the write instruction, the processing proceeds to Step 1208. In Step 1208, an instruction is generated by which the object is fetched from _Entx→val and assigned to a temporary variable t, code is generated by which a result of the assignment is compared with 0 by using the instruction (trapi instruction) capable of comparing the result quickly, and an instruction is generated by which the object (obj) is assigned to _Entx→val when the comparison result shows that the comparison targets do not match. This is because the comparison requires reading of the object. After the comparison is made and it is made sure that the condition is not satisfied, the object is written to the symbol. After the instructions are generated, the processing returns to Step 1204 to fetch the next instruction.

If the fetched instruction is determined to be not the write instruction in Step 1207, the processing proceeds to Step 1209. In Step 1209, it is determined whether or not the fetched instruction is the symbol deletion instruction. If the instruction is the deletion instruction, the processing proceeds to Step 1210 to generate an instruction to assign 0 to _Entx→val. The instruction is generated for the next processing. In the next processing, the value of 0 assigned is compared with 0 by the trapi instruction, the condition is satisfied, and thus the processing appropriately jumps to the handler. After the instruction is generated, the processing returns to Step 1204 to fetch the next instruction.

If the fetched instruction is not the symbol deletion instruction in Step 1209, the processing proceeds to Step 1211. In Step 1211, the source program is referred to, and thereby processing of generating a corresponding instruction is performed. Subsequently, the processing returns to Step 1204 to fetch the next instruction. In this case, the fetched instruction is such an instruction that does not affect the high-speed processing. Examples thereof include operation instructions such as addition, subtraction, multiplication, and division and method execution instructions. The instruction is generated by the conventionally known instruction generation processing.

Figure 13:
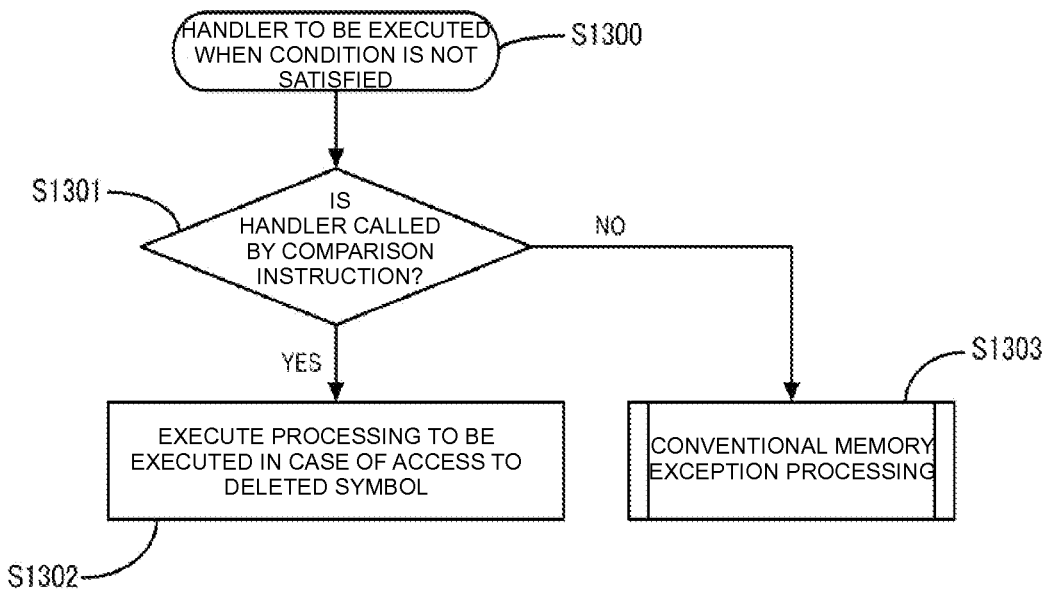
FIG. 13 illustrates a flow of processing which can occur in Step 1210 of FIG. 12 according to an embodiment of the invention.

FIG. 13 is a flowchart showing a processing flow to be executed when the condition is satisfied as a result of the trapi instruction. The processing is started from Step 1300. In Step 1301, it is determined whether or not the fetched instruction is the handler called as a result of the comparison with 0 by the instruction generated in Step 1206 or 1207 in FIG. 12. If the instruction is the handler, the processing proceeds to Step 1302 to execute processing to be executed in case of access to a deleted symbol. Specifically, a handler which is "throw noEntryException" is executed. If the instruction is not the handler, the processing proceeds to Step 1303 to execute processing, such as forced termination, as conventional memory exception processing.

Lastly, a description is given of (4) above. In the processing, as shown in FIG. 14, code by which a value in _Entx→val is read is generated by using an instruction to execute the handler in a location where a value stored in a symbol is read or a value is written to the symbol. The handler is executed when a special value, herein, 0x80000000 is read from any memory address. When a symbol is generated during code execution, an address of an object is registered and stored in _Entx→val.

For a case where a value stored in the symbol is read, the reading is performed by reading the value of _Entx→val. For a case where a value is written to the symbol, the writing is performed by reading the value of _Entx→val and then by writing the value to _Entx→val. When the symbol is deleted, a special value, herein 0x80000000 is assigned to _Entx→val. As the handler, processing to be executed at the absence of the symbol is generated. The processing is the handler "throw noEntryException" which is the same as above.

Figure 15:
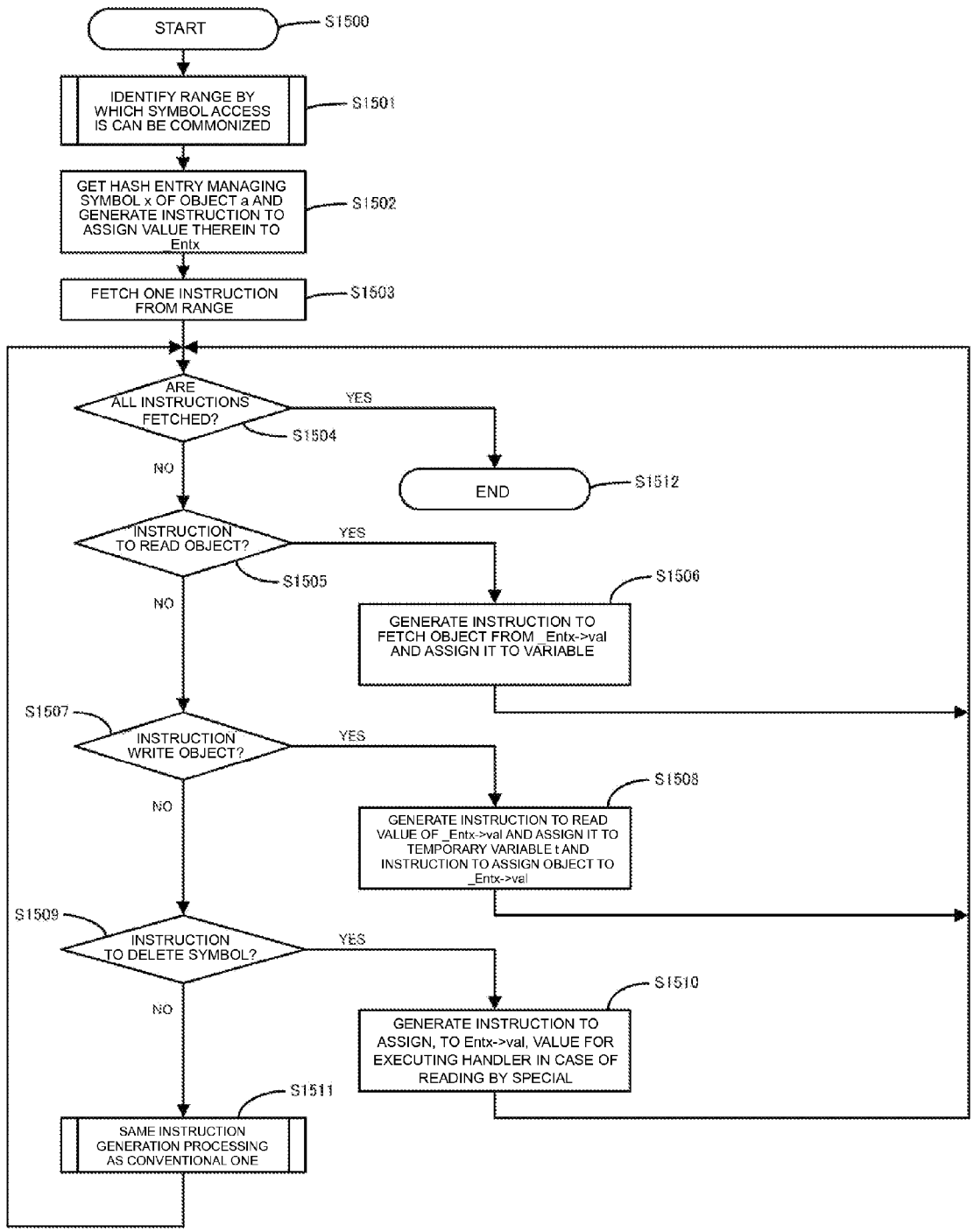
FIG. 15 is a flowchart illustrating a flow of the optimization processing according to an embodiment of the invention shown in FIG. 14.

The processing will be described in detail by referring to a flowchart shown in FIG. 15. The processing is started from Step 1500. In Step 1501, a symbol-access-commonizing-allowing range is identified.

In Step 1502, an instruction to get a hash entry managing the symbol "x" of the object "a" and to assign a value therein to _Entx is generated. As described above, access to the symbol table is made only the first time, and thereafter the accesses to the symbol are replaced with accesses to the entry. This leads to accesses with light overhead and increases the access speed.

Next, in Step 1503, one instruction is fetched from the identified range. Also in the similar manner as described above, instructions arranged in the identified range can be fetched one by one in order.

In Step 1504, it is determined whether or not there is any instruction to be fetched in the range. If there is no instruction therein, the processing proceeds to Step 1512 and then exits. On the other hand, if there is any instruction to be fetched, the processing proceeds to Step 1505. In Step 1505, it is determined whether or not the fetched instruction is the instruction to read an object in a symbol. In other words, it is determined whether or not the instruction is such an instruction as i=a·x. If the instruction is the read instruction, the processing proceeds to Step 1506. In Step 1506, instructions to fetch the object from Entx→val by the special instruction described in [0100] and to assign a value thereof to the variable i are generated. Unlike the processing shown in FIG. 9, the processing does not require the instruction to read a field (_type) in the object. This is because, if the symbol has been deleted, 0x80000000 is assigned to _Entx→val. An exception can be raised by reading the value. After the instruction is generated, the processing returns to Step 1504 to fetch the next instruction.

If the fetched instruction is not the instruction to read the object in the symbol in Step 1505, the processing proceeds to Step 1507. In Step 1507, it is determined whether or not the fetched instruction is the instruction to write the object to the symbol. In other words, it is determined whether the instruction is such an instruction as a·x=123. If the fetched instruction is the write instruction, the processing proceeds to Step 1508. In Step 1508, instructions are generated by which the value of _Entx→val by the special instruction described in [0100] is read and then is assigned to the temporary variable t and by which the object (obj) is assigned to _Entx→val.

Note that the instruction to read the value of _Entx→val and then to assign it to the temporary variable t is generated for the following purpose. Specifically, a value is checked if the handler is executed for the value. If not, the value is written to _Entx→val. After these instructions are generated, the processing returns to Step 1504 to fetch the next instruction.

If the fetched instruction is determined to be not the write instruction in Step 1507, the processing proceeds to Step 1509. In Step 1509, it is determined whether or not the fetched instruction is the symbol deletion instruction. If the instruction is the deletion instruction, the processing proceeds to Step 1510. In Step 1510, an instruction to assign the value 0x80000000 to _Entx→val is generated. When read by a special instruction, the value 0x80000000 triggers the execution of the handler. After the instruction is generated, the processing returns to Step 1504 to fetch the next instruction.

If the fetched instruction is determined in Step 1509 to be not the symbol deletion instruction, either, the processing proceeds to Step 1511. In Step 1511, the source program is referred to, and thereby processing of generating a corresponding instruction is performed. Subsequently, the processing returns to Step 1504 to fetch the next instruction. In this case, the fetched instruction is such an instruction that does not affect the high-speed processing. Examples thereof include operation instructions such as addition, subtraction, multiplication, and division and method execution instructions. The instruction is generated by the conventionally known instruction generation processing.

Figure 16:
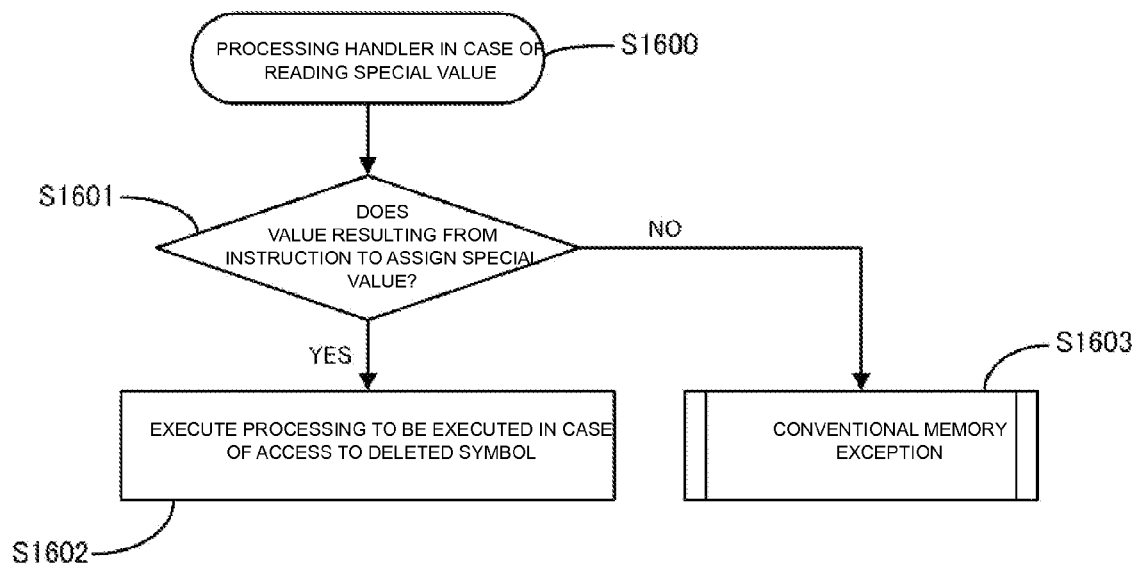
FIG. 16 illustrates a flow of processing which can occur in Step 1510 of FIG. 15 according to an embodiment of the invention.

FIG. 16 is a flowchart showing a processing flow which the handler executes when the special value is read. The processing is started from Step 1600. In Step 1601, it is determined whether or not the read special value results from the instruction generated in Step 1510 of FIG. 15. If the instruction results from the instruction, the processing proceeds to Step 1602 to execute processing to be executed in case of access to a deleted symbol. Specifically, a handler which is "throw noEntryException" is executed. If the instruction does not result from the instruction, the processing proceeds to Step 1603 to execute processing, such as forced termination, as conventional memory exception processing.

The optimization system and the optimization method of the present invention have been described by referring to the drawings. However, the technical scope of the present invention is not limited to the embodiment. The present invention can be changed within a range in which those skilled in the art can come up with by implementing another embodiment, or by adding any element to the present invention, or changing or omitting any element of the present invention. Any modes thus made should be included within the scope of the present invention, as long as these modes provide the same operations and advantageous effects as those of the present invention.

The optimization method can be implemented by a computer-readable compiler program, and the present invention can provide the compiler program. Note that the compiler program can be stored in a recording medium such as a CD-ROM, a DVD-ROM, an SD card or an HDD, and thus be provided therein.

The dynamic language has been increasingly employed also for a large-scale system due to its high development efficiency. Accordingly, many program products including dynamic-language-processing systems have been shipped. As described above, with the increase of opportunities of using the dynamic language, increasing the processing speed has become important. In increasing the processing speed, it is useful to provide the optimization system of the present invention and the method and the compiler program therefor.

That which is claimed:

1. An optimization system executed by a processor for optimizing a program described in a dynamic language, the system comprising:
 a range identifying unit to identify an identified range in the program in which access to a symbol can be commonized;
  wherein the identified range includes a plurality of instruction including a group of accessing instructions for accessing the symbol (variable) in the program;
 an instruction extracting unit that fetches the plurality of instructions from the identified range one by one;
 an instruction judging unit that determines whether each of the fetched instructions is one of the accessing instructions;
 an instruction generating unit that generates a plurality of optimized instructions;
  wherein optimization is based on the accessing instructions included in the identified range, and
  wherein the plurality of optimized instructions can be instructions (1) to access a symbol table, (2) to retrieve a symbol entry address in which a value object address is held of a value object, and (3) to store the value object address in an address storage unit;
   wherein the symbol table has (i) a key for identifying each symbol and (ii) the value object address of the value to be stored in the symbol, wherein the key and the value object address are stored in association with each other,
   wherein accessing the symbol table is done by using the key for identifying the symbol to be accessed;
  wherein, if the instruction judging unit determines that the fetched instruction is one of the accessing instructions, and if the symbol is present when generating the optimized instruction, the instruction generating unit generates the optimized instruction allowing immediate access to the symbol without checking whether the symbol is present or not;
   wherein the optimized instruction is generated based on the fetched instruction by using the symbol entry address in the address storage unit.

2. The optimization system according to claim 1, wherein optimization occurs if any one of the following operations is preformed: generating code during compiling; generating the symbol during execution of the generated code; deleting the symbol during the execution; reading the value object stored in the symbol during the execution; and writing the value object to the symbol during the execution.

3. The optimization system according to claim 1, wherein the accessing instruction includes any one of the group consisting of: a read instruction to read the value object stored in the symbol, a write instruction to write the value object to the symbol, and a delete instruction to delete the symbol.

4. The optimization system according to claim 1, further comprising a symbol judging unit that determines whether or not the symbol is present;
 wherein when the symbol judging unit determines that the symbol is not present, the instruction generating unit generates a check instruction to check whether or not the symbol is present and an exception instruction to raise an exception if the symbol is absent.

5. The optimization system according to claim 1, wherein if the instruction judging unit determines that the fetched instruction is one of the accessing instructions and if the fetched instruction is a delete instruction, the instruction generating unit generates a replace instruction to replace the value object address in the symbol entry stored in the address storage unit with an invalid address.

6. The optimization system according to claim 1, wherein, on condition that the instruction judging unit determines that the fetched instruction is one of the accessing instructions,
 the instruction generating unit generates the optimized instruction and generates a comparison instruction to make a comparison between 0 and the value object address of the value object to be stored in the symbol, if the fetched instruction is a read instruction or a write instruction, and
 the instruction generating unit generates an instruction to assign 0 to the value object address if the fetched instruction is a delete instruction.

7. The optimization system according to claim 1, wherein if the instruction judging unit determines that the fetched instruction is one of the accessing instructions and if the fetched instruction is a delete instruction, the instruction generating unit generates an assign instruction to assign a value of the value object address, which when read, triggers execution of a handler configured to raise an exception.

8. An computer-implemented optimization method in an optimization system for optimizing a program described in a dynamic language, the method comprising the steps of:
 interpreting the program to identify a range as a range by which the access to the symbol is allowed to be commonized;
  wherein the identified range includes a plurality of instruction including a group of accessing instructions to access a symbol (variable) in the program;
 fetching the plurality of instructions from the identified range one by one;
 judging whether each of the fetched instructions is one of the accessing instructions;
 generating an optimized instruction to do any of the following: (1) to access a symbol table, (2) to get a symbol entry address of a symbol entry in which a value object address is held wherein the value object is to be stored in the symbol, and (3) to store the value object address in an address storage unit;
  wherein the symbol table has (i) a key for identifying each symbol, and (ii) the value object address, wherein the key and the value object address are stored in association with each other;
  wherein the optimized instruction is generated by using the key for identifying the symbol to be accessed; and
  wherein if it is determined that the fetched instruction is one of the accessing instructions, and if the symbol is present when generating the optimized instruction, generating the optimized instruction allowing an access to be made to the symbol occurs immediately without checking whether the symbol is present or not;
wherein generating the optimized instruction is based of the fetched instruction by using the symbol entry address in the address storage unit.

9. The optimization method according to claim 8, wherein the optimization method is performed when any of the following operations occurs: generating code during compiling; generating the symbol during execution of the generated code; deleting the symbol during the execution; reading the value object stored in the symbol during the execution; and writing the value object to the symbol during the execution.

10. The optimization method according to claim 8, wherein one of the accessing instructions is selected from the group consisting of: a read instruction to read the value object stored in the symbol, a write instruction to write the value object to the symbol, and a delete instruction to delete the symbol.

11. The optimization method according to claim 8, further comprising the step of judging whether or not the symbol is present,
wherein, if it is determined that the symbol is not present in the step of judging whether each of the fetched instructions is one of the accessing instructions,
generating a check instruction, in the step of generating the optimized instruction, to check whether or not the symbol is present and an exception instruction to raise an exception if the symbol is absent.

12. The optimization method according to claim 8, wherein if it is determined that the fetched instruction is one of the accessing instructions in the step of judging whether each of the fetched instructions is one of the accessing instructions and if the fetched instruction is a delete instruction to delete the symbol,
generating a replace instruction, in the step of generating the optimized instruction allowing the access, to replace the value object address in the symbol entry stored in the address storage unit with an invalid address in the step of generating the optimized instruction allowing the access.

13. The optimization method according to claim 8, wherein on the condition that the fetched instruction is determined to be one of the accessing instructions in the step of judging whether each of the fetched instructions is one of the accessing instructions,
generating a comparison instruction to make a comparison between 0 and the value object address is together with the optimized instruction, if the fetched instruction is a read instruction to read the value object of the symbol or a write instruction to write the value object, and
generating an assign instruction to assign 0 to the value object address, if the fetched instruction is a delete instruction.

14. The optimization method according to claim 8, wherein if it is determined that the fetched instruction is one of the accessing instructions and if the fetched instruction is a delete instruction,
generating an assign instruction, in the step of generating the optimized instruction allowing the access, to assign a value of the value object address, which when read, triggers execution of a handler configured to raise an exception.

15. An article of manufacture tangibly embodying computer readable instructions which, when implemented, cause a computer to carry out the steps of a method according to claim 8.

16. An article of manufacture tangibly embodying computer readable instructions which, when implemented, cause a computer to carry out the steps of a method according to claim 9.

17. An article of manufacture tangibly embodying computer readable instructions which, when implemented, cause a computer to carry out the steps of a method according to claim 10.

18. An article of manufacture tangibly embodying computer readable instructions which, when implemented, cause a computer to carry out the steps of a method according to claim 11.

19. An article of manufacture tangibly embodying computer readable instructions which, when implemented, cause a computer to carry out the steps of a method according to claim 12.

20. An article of manufacture tangibly embodying computer readable instructions which, when implemented, cause a computer to carry out the steps of a method according to claim 13.

21. An article of manufacture tangibly embodying computer readable instructions which, when implemented, cause a computer to carry out the steps of a method according to claim 14.

* * * * *